J. H. SPRAGUE.
WIND SHIELD.
APPLICATION FILED AUG. 10, 1909.

995,301.

Patented June 13, 1911.

2 SHEETS—SHEET 1.

WITNESSES

INVENTOR
James H. Sprague
BY
ATTORNEYS

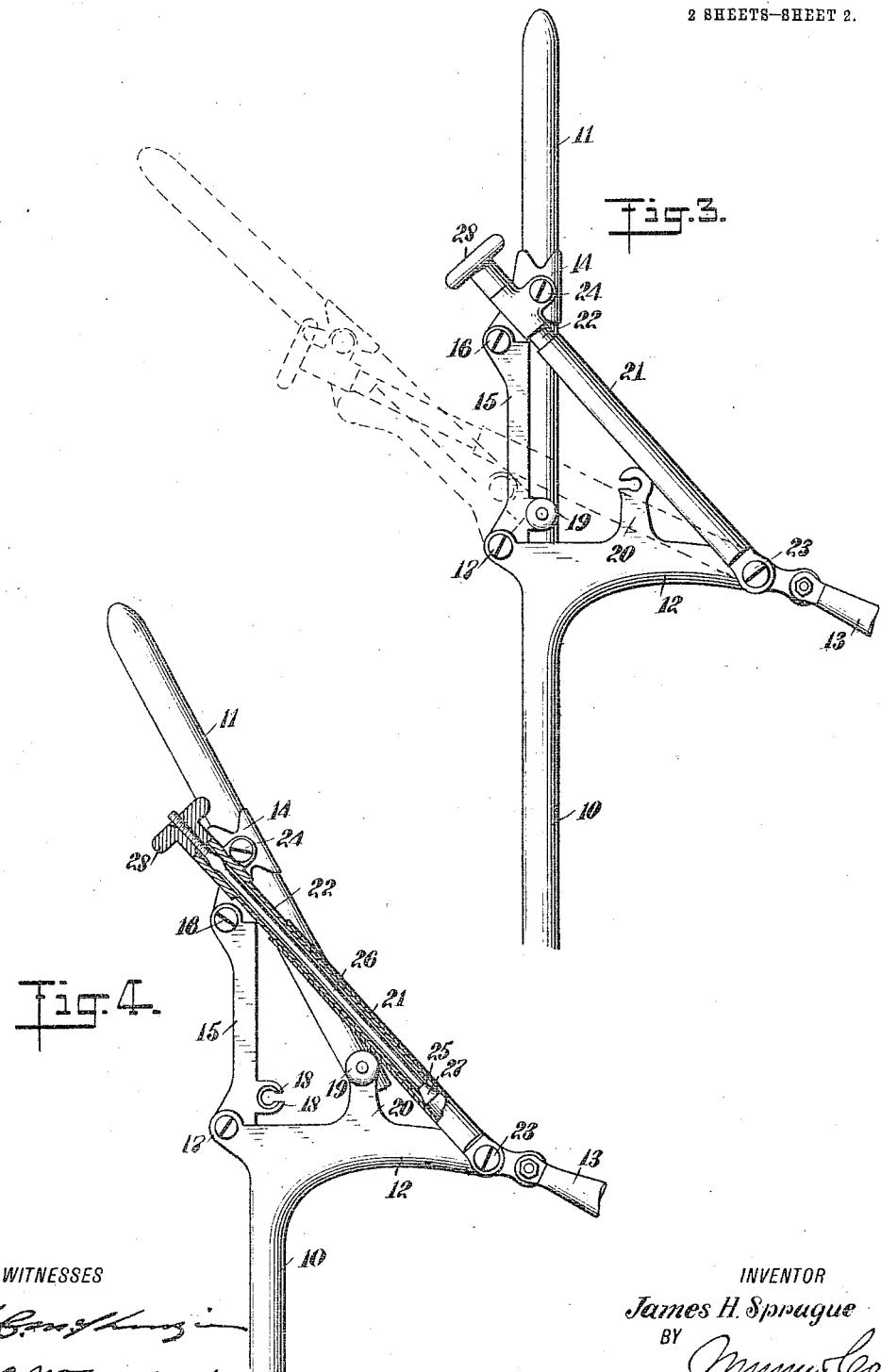

UNITED STATES PATENT OFFICE.

JAMES H. SPRAGUE, OF NORWALK, OHIO.

WIND-SHIELD.

995,301.

Specification of Letters Patent. Patented June 13, 1911.

Application filed August 10, 1909. Serial No. 512,164.

*To all whom it may concern:*

Be it known that I, JAMES H. SPRAGUE, a citizen of the United States, and a resident of Norwalk, in the county of Huron and State of Ohio, have invented a new and Improved Wind-Shield, of which the following is a full, clear, and exact description.

This invention relates to certain improvements in wind shields for use upon automobiles or other vehicles, and more particularly to that type of wind shield in which there is a lower section rigidly secured in place and an upper section movable in respect thereto so as to be in alinement with the stationary section or closely adjacent thereto and substantially parallel therewith.

In my improved wind shield the movement of the upper section is controlled and limited by two separate and distinct connecting means. One of these connecting means permits the two sections to move as though hinged together or permits them to be held with their adjacent edges spaced apart and in different planes. The other connecting means serves to lock the two sections in their adjusted position.

Reference is to be had to the accompanying drawings, forming a part of this specification, in which similar characters of reference indicate corresponding parts in all the figures, and in which—

Figure 1:
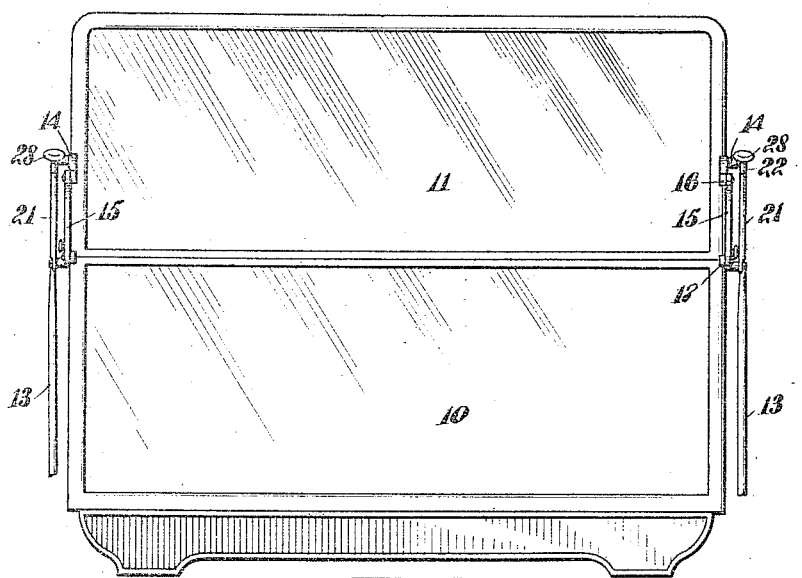
Figure 2:
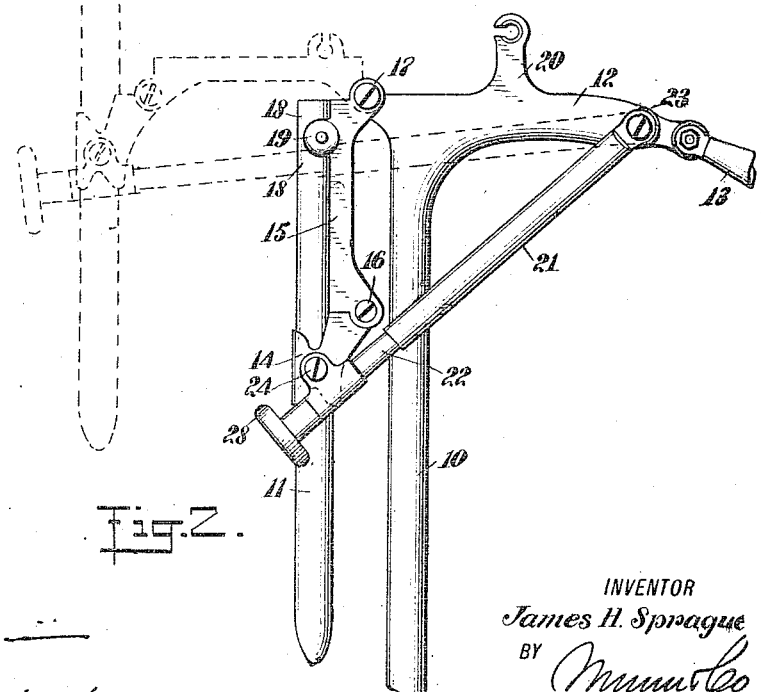

Figure 1 is an elevation of the wind shield showing the rear side thereof, that is, the side toward the steering wheel of the automobile; Fig. 2 is an end view of the shield, showing in solid lines the movable section in its lowered or folded position, and showing in dotted lines the upper section in an intermediate position; Fig. 3 is an end view showing in solid lines the two sections in alinement, and showing in dotted lines the upper section in a rearwardly inclined position; and Fig. 4 is an end view showing the upper section spaced from the lower section and at an angle in respect thereto.

The specific form of the sections of the shield, that is, the form of the frame, the manner of securing the glass in place and the manner of securing the lower section stationary, constitute no portion of my present invention. The present invention relates solely to the means for connecting the two sections together and for holding the upper section in its adjusted position.

The shield is formed of a lower section 10 held rigid to the vehicle, and an upper section 11 movable in respect to the lower section. The lower section has two forwardly-extending brackets 12, 12, adjacent opposite side edges thereof and substantially parallel in respect to each other. To these brackets may be secured the upper ends of brace rods 13, 13, the lower ends of which extend forwardly to the front portion of the vehicle. The upper section 11 is provided with a bracket 14, secured to each side edge thereof intermediate the upper and lower edges. A link 15 has one end secured to this bracket by means of a pivot or hinge pin 16, and has the opposite end secured to the frame of the lower wind shield section or to the bracket 12 by means of a pivot pin or hinge pin 17. The link adjacent its connection with the stationary shield section has two outwardly-extending lugs 18, 18, between which there may be received an outwardly-extending set screw 19 on the side edge of the movable section 11 and adjacent one corner thereof. With this set screw inserted between the two lugs and tightened in place, the link 15 becomes rigid in respect to the movable shield section. With the parts secured in this manner, there can be no movement at the hinge 16 and all relative movement of the two sections will be upon the hinge 17. The two sections have the same movement as though they were secured together by an ordinary hinge, and the two sections may be in alinement with each other, as indicated in Fig. 3, or the upper section may be folded down to a position adjacent to and substantially parallel with the lower section, as indicated in Fig. 2.

Each bracket 12 has a short upwardly-extending arm 20 rigid in respect to the bracket and having a recess in the side thereof opposite to the recess between the two lugs 18. This recess is so disposed that when the two wind shield sections are in alinement with each other, as indicated in Fig. 3, the set screw 19 may be loosened and the lower edge of the wind shield swung forwardly about the hinge 16 as a pivot, so as to bring the set screw into the recess in the arm 20. By tightening the set screw, the two sections will be locked rigid in respect to each other with the lower edge of the upper section in advance of the upper edge of the lower section, and with the upper section inclined substantially as shown in Fig. 4. With the upper section in this position, the driver will be protected by the upper section, and, at the same time, he can look downward between the two sections and see the road in front of the machine. The placing of the lower edge of the upper section in advance of the lower section, prevents rain from beating through the opening between the two sections. During the movement of the upper section from the position shown in Fig. 3 to the position shown in Fig. 4, there is no movement of the link 15 and the upper section moves about the hinge 16 as a center.

In moving the upper section from the upright position shown in Fig. 3 to the depending or folded position shown in Fig. 2, it is desirable that the set screw 19 be loosened so that the upper section may first be inverted about the hinge 16 and then be lowered by a movement about the hinge 17, as indicated in dotted lines in Fig. 2. In this manner the movable section will be kept comparatively close to the stationary section and can be made to avoid a steering wheel or other obstruction closely adjacent the shield.

For locking the upper section rigidly in position, I employ a second connection between the stationary and movable sections which constitutes an important part of my invention. This second connection preferably includes a link formed of two telescoping sections 21 and 22 capable of being locked against relative movement in respect to each other. The section 21 is in the form of a cylinder or tube with one end closed and secured to the bracket 12 by a pivot pin 23. The opposite end of the tube or cylinder is open to receive the other section 22 of the link. This section 22 is secured to the bracket 14 on the movable section by a pivot pin 24 and the lower or inner end of the link 22 is expansible to grip the inner surface of the section 21. As shown, the inner end of the section 22 is split to form a plurality of separate prongs 25, and inside of the section 22 there is a longitudinally movable rod 26 with an enlarged head 27. The rod extends out through the outer end of the section 22 and is prevented from rotating in respect thereto but may move longitudinally. A hand wheel 28 is threaded to the outer end of the rod and adjacent the end of the section 22. By turning the wheel, the rod may be pulled outward, so as to bring the enlarged head 27 between the prongs 25 and spread the latter apart to grip the inner surface of the section 21. The link is extensible to permit the movement of the upper wind shield section, but may be locked so as to prevent any variation in its length, and thus hold the upper section in adjusted position.

With the movable section of the shield locked rigidly to the link 15, the upper section may be held in any desired inclined position, for instance, that shown in dotted lines in Fig. 3, by elongating and locking the link formed of the sections 21 and 22.

With the movable wind shield section in its lowered position as shown in Fig. 2, there can be no relative movement or rattling of the sections, as the link constitutes a diagonal brace. By means of the hinged link and the extensible link, the movable section is capable of an almost infinite number of different adjustments.

As the link section 21 is closed at the lower end and as the head 27 substantially closes the lower end of the section 22, it is evident that the section 22 constitutes a piston mounted to reciprocate within the cylinder 21 and that the relative movement of the two is cushioned by the compression or the expansion of the air within the cylinder. This cushioning prevents the sudden or jerky movement of the upper section during the adjusting of the latter.

Having thus described my invention, I claim as new and desire to secure by Letters Patent:

1. A wind shield formed of a lower section, and an upper section movable with respect thereto, a link hinged at its upper end to said upper section, and at its lower end to said lower section, means for locking the lower end of said link to said upper section, whereby said link can be rendered rigid relative to said upper section, and an extensible link pivotally connecting said upper section and said lower section, and affording means for holding said upper section in any one of a plurality of positions relative to said lower section.

2. A wind shield comprising a lower section having an outwardly extending bracket, an upper section, a link having one end pivoted to the upper section intermediate the top and bottom of the latter, and having the opposite end pivotally connected to the lower section, means for securing the lower end of said upper section to said link, means for securing the lower end of said upper section to said bracket, and a telescopic member connecting said bracket and said upper section.

3. A wind shield formed of a lower section having an outwardly-extending bracket, an upper section movable in respect to the lower section, a link having its opposite ends hinged to said sections, means for locking the upper section rigid in respect to the link, and a diagonally-disposed telescopic link connecting said bracket and said upper section.

4. A wind shield, comprising a lower section having an outwardly-extending bracket, said bracket having an upwardly-extending arm, an upper section, a link having one end pivoted to the upper section intermediate the top and bottom of the latter and having the opposite end pivotally connected to the lower section, means for securing the lower end of said upper section to said arm or to the lower portion of said link and a brace connecting said bracket and said upper section.

5. A wind shield, comprising a lower section having an outwardly-extending bracket, said bracket having an upwardly-extending arm, an upper section, a link having one end pivoted to the upper section intermediate the top and bottom of the latter and having the opposite end pivotally connected to the lower section, means for securing the lower end of said upper section to said arm or to the lower portion of said link, and an extensible member having one end connected to said bracket and having the opposite end connected to said upper section adjacent the connections between the latter and said link.

6. A wind shield, comprising a lower section having an outwardly-extending bracket, an upper section, means for securing the lower edge of the upper section adjacent to and in the plane of the upper edge of the lower section, means for securing the lower edge of the upper section to said bracket out of the plane of the lower section, and an extensible member independent of the last-mentioned means for connecting the upper section and said bracket.

In testimony whereof I have signed my name to this specification in the presence of two subscribing witnesses.

JAMES H. SPRAGUE.

Witnesses:
  LOUIS W. WICKHAM,
  THOS. B. PATCH.